(12) United States Patent
Chen et al.

(10) Patent No.: US 9,285,651 B2
(45) Date of Patent: Mar. 15, 2016

(54) ELECTRO-OPTIC SILICON MODULATOR WITH LONGITUDINALLY NONUNIFORM MODULATION

(71) Applicant: SiFotonics Technologies Co., Ltd., Woburn, MA (US)

(72) Inventors: Changhua Chen, Beijing (CN); Dong Pan, Andover, MA (US); Yanwu Zhang, Beijing (CN); Wang Chen, Beijing (CN); Pengfei Cai, Beijing (CN); Ching-yin Hong, Lexington, MA (US); Siying Liu, Xi'an (CN)

(73) Assignee: SiFotonics Technologies Co, Ltd., Woburn, MA (US)

( * ) Notice: Subject to any disclaimer, the term of this patent is extended or adjusted under 35 U.S.C. 154(b) by 0 days.

(21) Appl. No.: 14/187,023

(22) Filed: Feb. 21, 2014

(65) Prior Publication Data

US 2014/0241658 A1   Aug. 28, 2014

Related U.S. Application Data

(60) Provisional application No. 61/850,779, filed on Feb. 22, 2013.

(51) Int. Cl.
*G02F 1/00*  (2006.01)
*G02F 1/225*  (2006.01)
*G02F 1/025*  (2006.01)
*G02B 6/12*  (2006.01)

(52) U.S. Cl.
CPC .............. *G02F 1/2257* (2013.01); *G02F 1/025* (2013.01); *G02B 2006/12097* (2013.01); *G02B 2006/12142* (2013.01)

(58) Field of Classification Search
CPC .................. G02F 1/025; G02F 1/2257; G02B 2006/12097; G02B 2006/12142
See application file for complete search history.

(56) References Cited

U.S. PATENT DOCUMENTS

| 6,845,198 | B2 | 1/2005 | Montgomery et al. |
| 7,136,544 | B1 * | 11/2006 | Gunn et al. ........................ 385/3 |
| 8,149,493 | B2 | 4/2012 | Chen |
| 2010/0060970 | A1 | 3/2010 | Chen |
| 2010/0316324 | A1 | 12/2010 | Webster et al. |

* cited by examiner

*Primary Examiner* — Jerry Rahll
(74) *Attorney, Agent, or Firm* — Han IP Corporation

(57) ABSTRACT

A device, such as a silicon modulator, in accordance with the present disclosure employs PN diodes without sacrificing the modulation depth, while achieving lower loss and better impedance matching to 50-Ohm drivers. In one embodiment, the device includes an input waveguide, an input optical splitter coupled to the input waveguide, first and second optical phase shifters coupled to the input optical splitter, an output optical splitter coupled to the first and second phase shifters, and an output waveguide coupled to the output optical splitter. The phase shifters are designed with variant capacitance per unit length.

10 Claims, 4 Drawing Sheets

105/106

ELECTRO-OPTIC SILICON MODULATOR WITH LONGITUDINALLY NONUNIFORM MODULATION

CROSS-REFERENCE TO RELATED PATENT APPLICATION

This application is the non-provisional application of, and claims the priority benefit of U.S. Patent Application No. 61/850,779, filed on Feb. 22, 2013, which is herein incorporated by reference in its entirety.

TECHNICAL FIELD

The present disclosure is related to silicon electro-optic modulators and, in particular, to high-speed and low energy-consumption silicon electro-optic modulators.

BACKGROUND

Silicon electro-optic modulators play an increasing role in the field of optic communication due to its process compatibility with CMOS technology. Standard silicon electro-optic modulators employ MOS capacitors or reverse biased PN diodes to achieve a large modulation bandwidth even up to 30 GHz. Silicon electro-optic modulators with MOS capacitors have the merit of higher modulation efficiency at the expense of optic power compensating for the loss from the poly-silicon, which includes one part of the capacitors. Silicon electro-optic modulators with PN diodes have the advantage of lower optic loss at the expense of modulation efficiency. The modulation depth, i.e., the total phase change of the modulator, is proportional to the modulation efficiency and the length of the modulator. Thus, it generally takes much longer for modulators with PN diodes than those with MOS capacitors to obtain the same modulation depth. For such a longer PN type modulator, a properly designed microwave traveling electrode such as a coplanar waveguide or a coplanar strip line is required for high speed modulation. It is preferable that the length of the electrodes is kept as short as possible for high speed modulation. However, there exists a dilemma for the PN type modulator to have the conflicting requirements of a shorter device for high speed modulation and a longer device for big modulation depth.

The modulation efficiency of a modulator is proportional to the capacitance per unit length of the modulator. Higher capacitance per unit length means higher microwave loss and lower modulation speed. A trade-off between the modulation efficiency and modulation speed must be made. Also, higher capacitance per unit length gives rise to lower microwave impedance in the order of 20–30 Ohm. It makes the impedance matching to the modulator driver difficult, and a specially designed driver with output impedance much lower than standard 50 Ohm is required. In the meantime, the low microwave impedance of the modulator and driver increases the RF power consumption of the transmitter employing the modulator.

SUMMARY

In one aspect, a device such as an electro-optic silicon modulator may include an input waveguide, an input optical splitter coupled to the input waveguide, first and second optical phase shifters coupled to the input optical splitter, an output optical splitter coupled to the first and second phase shifters, and an output waveguide coupled to the output optical splitter.

In one embodiment, at least one of the first and second phase shifters may have variant capacitance per unit length along a direction of optical propagation.

In one embodiment, at least one of the first and second phase shifters may have a first section with a lowest capacitance per unit length along a direction of optical propagation.

In one embodiment, at least one of the first and second phase shifters may have a second section with a highest capacitance per unit length along the direction of optical propagation.

In one embodiment, at least one of the first and second phase shifters may have a third section with a capacitance per unit length varying from the lowest to the highest capacitance per unit length along the direction of optical propagation.

In one embodiment, at least one of the first and second phase shifters may have a fourth section with a capacitance per unit length varying from the highest to the lowest capacitance per unit length along the direction of optical propagation.

In one embodiment, at least one of the first and second phase shifters may include, in a transverse direction: a substrate, a light transmission structure formed on a top surface of the substrate, a first contact, and a second contact. The light transmission structure may include: a first doped region doped with dopants of a first polarity, a second doped region doped with dopants of a second polarity opposite the first polarity, a lateral PN junction formed by a part of the first doped region and a part of the second doped region, the lateral PN junction oriented substantially perpendicular to the top surface of the substrate, and a vertical PN junction formed by a part of the first doped region and a part of the second doped region, the vertical PN junction oriented substantially parallel to the top surface of the substrate. The first contact may be electrically coupled to the first region. The second contact may be electrically coupled to the second region.

In one embodiment, the first contact and the second contact may be positioned outside of a region in which light propagates.

In one embodiment, the first doped region may be doped with N-type dopants and the second doped region may be doped with P-type dopants.

In one embodiment, the lateral PN junction may be adjacent to the vertical PN junction.

In one embodiment, a width of the vertical PN junction may vary along a direction of optical propagation.

In one embodiment, a width of the vertical PN junction may have a smallest value followed by a biggest value along a direction of optical propagation.

In one embodiment, a width of the vertical PN junction may vary from the smallest value to the biggest value or from the biggest value to the smallest value.

In one embodiment, the first doped region may be doped with P-type dopants and the second doped region may be doped with N-type dopants.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter.

DETAILED DESCRIPTION OF THE PREFERRED EMBODIMENTS

Overview

The present disclosure aims to provide a high-speed silicon modulator using PN diodes without sacrificing the modulation depth, while achieving lower loss and better impedance matching to 50-Ohm drivers.

In a general aspect, an optoelectronic device is fabricated on silicon (Si) or silicon-on-insulator (SOI) wafers to implement electro-optic modulation. A device according to the present disclosure may include two waveguides on which an applied electrical field would cause a phase change of an optic signal propagated along the waveguides and convert the phase change to an amplitude change of the optic signal. Each of the two waveguides may have specially doped regions including PN junctions, or PN diodes. The capacitance per unit length of the PN junction varies along the waveguides.

Figure 1:
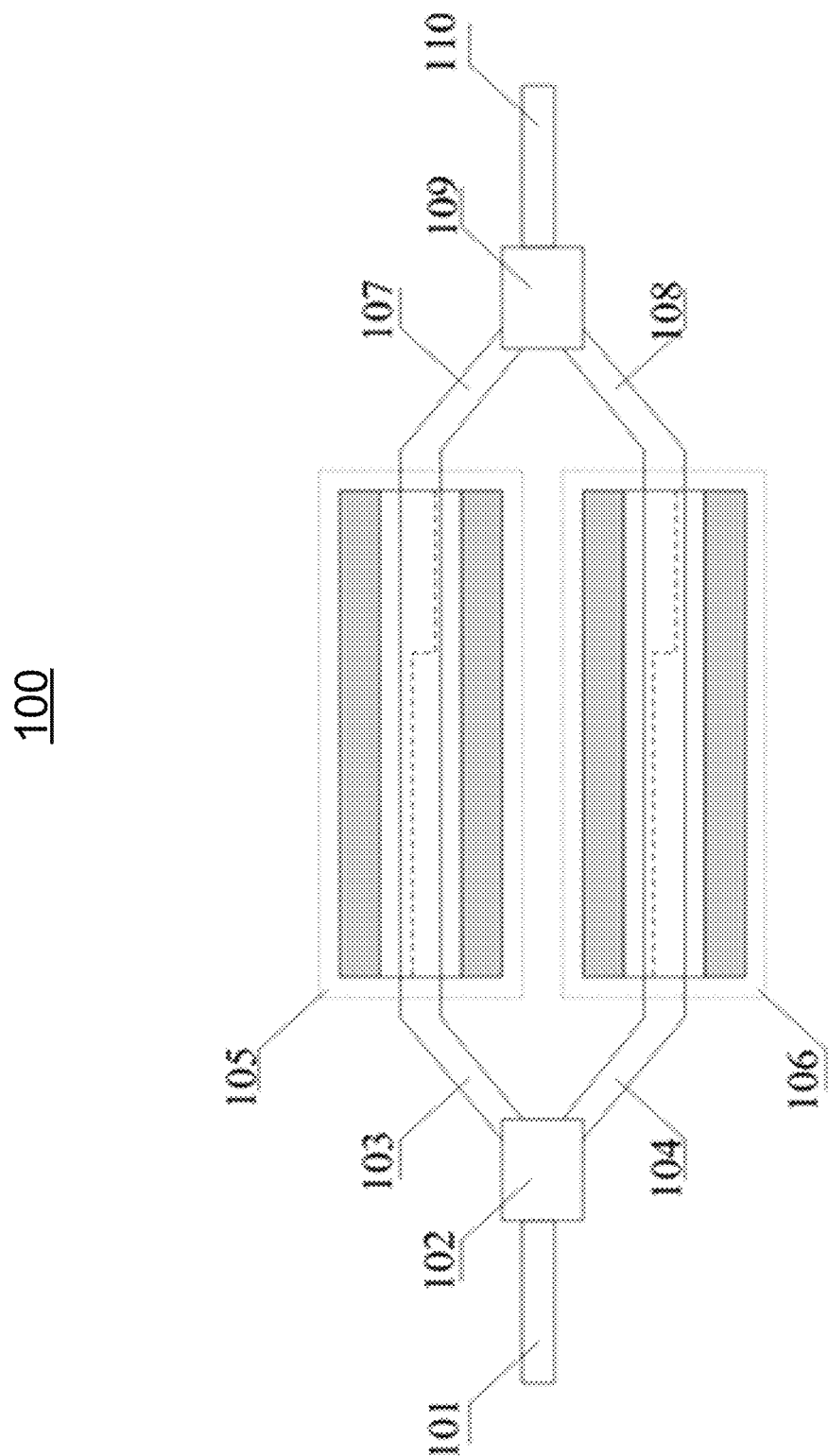
FIG. 1 is a diagram of an electro-optic silicon modulator with specially doped waveguides in accordance with an embodiment of the present disclosure.

FIG. 1 illustrates an electro-optic silicon modulator 100 with specially doped waveguides in accordance with an embodiment of the present disclosure. In one embodiment, the silicon modulator 100 is implemented as a Mach-Zehnder Interferometer (MZI) incorporating two deliberately designed silicon optical phase shifters 105 and 106 as shown in FIG. 1. The MZI includes an input waveguide 101, an input optical splitter 102, two arms 103 and 104 connecting the input optical splitter 102 to the phase shifters 105 and 106, respectively, an output optical splitter 109, two arms 107 and 108 connecting the phase shifters 105 and 106 to the output optical splitter 109, respectively, and an output waveguide 110. The input and output optical splitters 102 and 109 may be based on Y-splitter, multimode inference (MMI), directional coupler, or other structures.

Figure 2A:
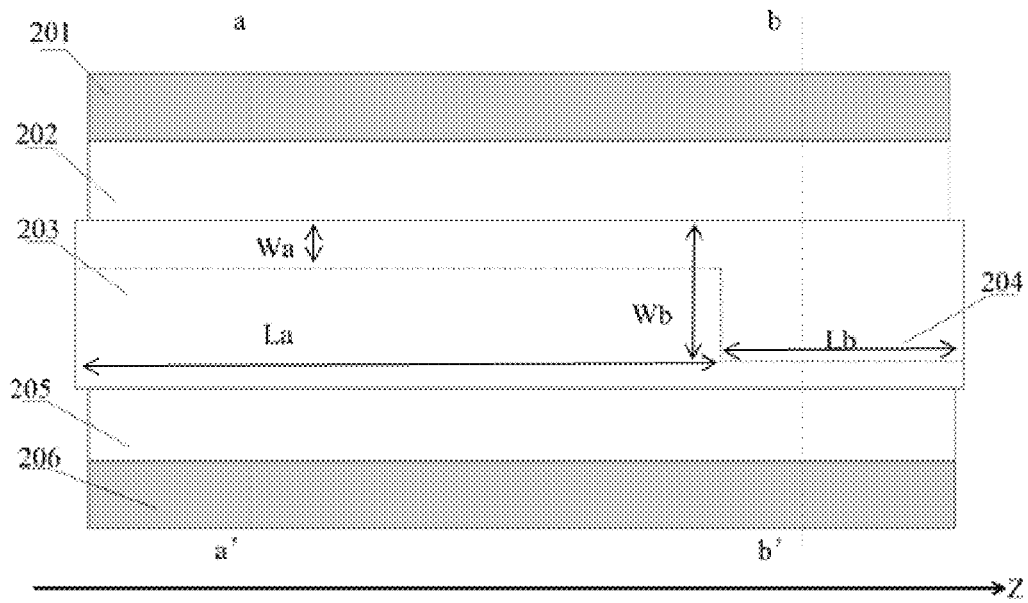
FIG. 2A is a top view of a silicon phase shifter in accordance with an embodiment of the present disclosure.
Figure 2B:
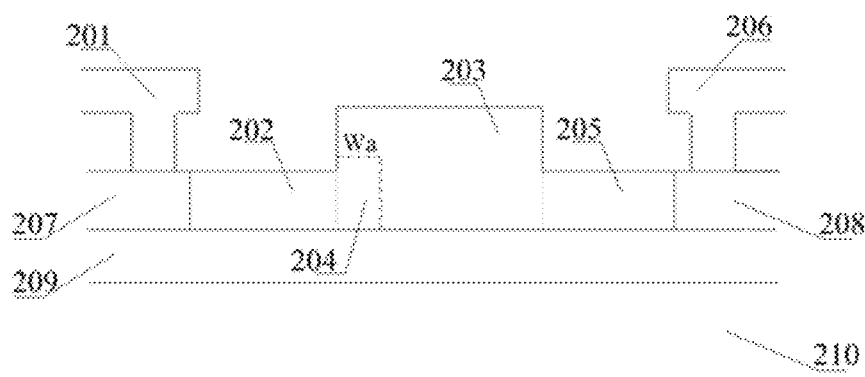
FIG. 2B is a cross-sectional view of the phase shifter of FIG. 2A along line aa'.
Figure 2C:
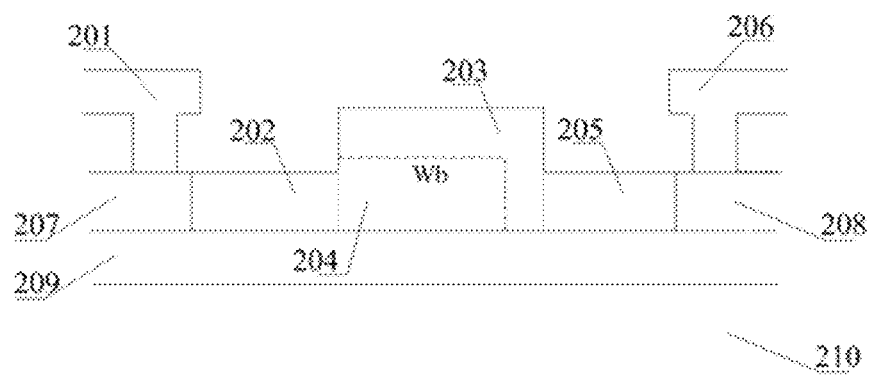
FIG. 2C is a cross-sectional view of the phase shifter of FIG. 2A along line bb'.

FIG. 2A illustrates a top view of the phase shifter 105/106 in accordance with an embodiment of the present disclosure. FIG. 2B illustrates a cross-sectional view of the phase shifter 105/106 along line aa'. FIG. 2C illustrates a cross-sectional view of the phase shifter 105/106 along line bb'. As the phase shifter 105 and the phase shifter 106 are structurally identical, the following description applies to both the phase shifters 105 and 106.

The phase shifter 105/106 includes electrodes 201 and 206. Electrode 201 is ohmic and in contact with a silicon slab 207. Electrode 206 is ohmic and in contact with a silicon slab 208. Silicon slabs 207 and 208 are oppositely doped with high concentration of P type or N type dopant, respectively. In the example shown in FIGS. 2A-2C, silicon slab 207 is doped with P-type dopants and silicon slab 208 is doped with N-type dopants.

As shown in FIGS. 2A-2C, regions 202, 203, 204 and 205 include a ridge optical waveguide, and provide a path for the optical signal. Region 209 is a silicon dioxide layer and region 210 is a silicon substrate.

In one embodiment, regions 202 and 204 are doped with P-type dopants and regions 203 and 205 are doped with N-type dopants. The vertical boundary between regions 204 and 203 forms a lateral PN junction, or a lateral PN diode. The horizontal boundary between regions 204 and 203 forms a vertical PN junction, or a vertical PN diode. A reverse-bias voltage applied on the PN junctions causes an optical refractive index change of the phase shifters 105/106 and thus causes the phase change of the optical signal propagating through the ridge waveguide.

The phase shifter 105/106 has two sections. A first section La has the vertical PN junction width Wa from Z=0 to Z=La. A second section Lb has the vertical PN junction width Wb from Z=La to the end of the phase shifter 105/106. Different vertical junction width W may be defined by a properly designed mask layout for ion implant process.

Different vertical PN junction width provides different capacitance per unit length and thus different modulation efficiency for the phase shifter 105/106. For example, the vertical PN junction width Wa changes along the direction of optical propagation. By changing Wa along the direction of optical propagation, high bandwidth and impedance matching can be achieved. In other words, a key technical feature of the present disclosure is the variant capacitance per unit length.

The capacitance per unit length for vertical PN junction width Wa is Ca and designed to be about 0.15 pF/mm~0.2 pF/mm. The capacitance per unit length for vertical PN junction width Wb is Cb and designed to be 0.4 pF/mm~0.6 pF/mm. Thus, the modulation efficiency of section Lb is 2~3 times that of the section La. Generally, the length of La is in the range of 2 mm~3 mm, and Lb is in the range of 0.5 mm~1 mm. In this way, the length of the modulator can be decreased from greater than 4 mm of a common lateral PN junction modulator to less than 3 mm or even shorter for this embodiment without the sacrifice of the modulation depth.

With shorter phase shifter the microwave loss from the microwave transmission line may be reduced. Also, the ratio of Lb/La may be properly designed to maximized the modulation bandwidth up to 20 GHz or even greater.

Figure 3:
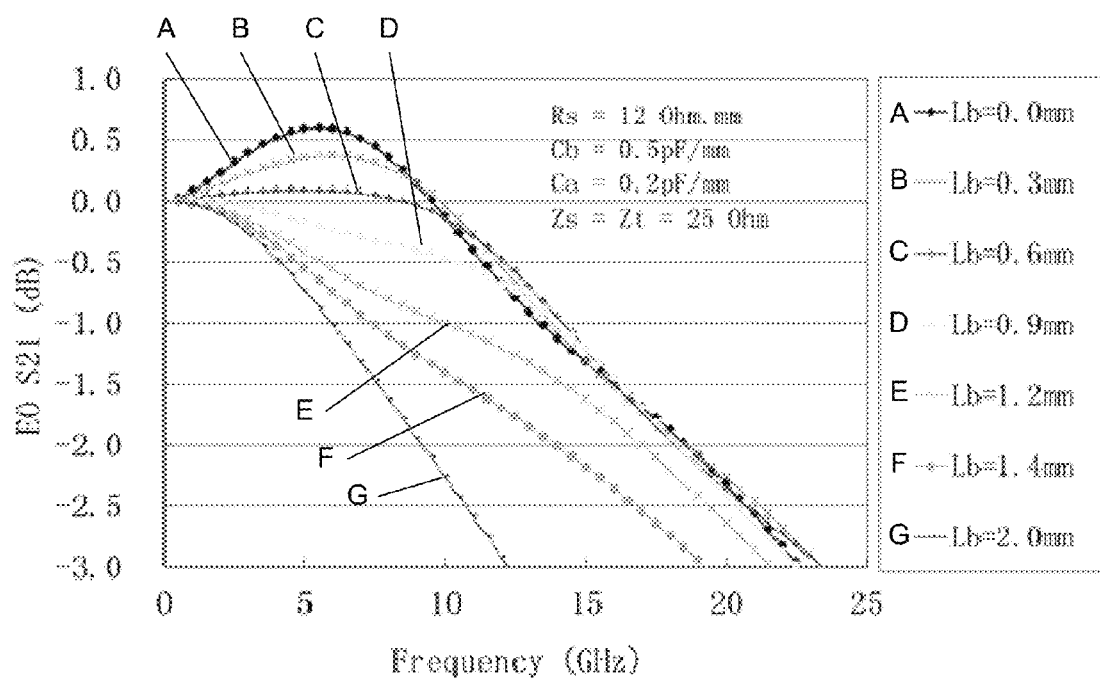
FIG. 3 is a chart of bandwidth design curves of various Lb lengths in accordance with an embodiment of the present disclosure.

FIG. 3 is a chart 300 of bandwidth design curves of various Lb lengths in accordance with an embodiment of the present disclosure. In particular, FIG. 3 shows the designed response curves with different Lb length. In this design, the modulation efficiency of section Lb is about two times that of section La, so the total length La+Lb is maintained at 4.0-Lb to obtain the same modulation depth as that of a 4 mm long La only section. It can be seen from FIG. 3 that there is an optimum Lb length to obtain greater than 20 GHz 3 dB bandwidth and with flat response at frequencies lower than 10 GHz.

Figure 4:
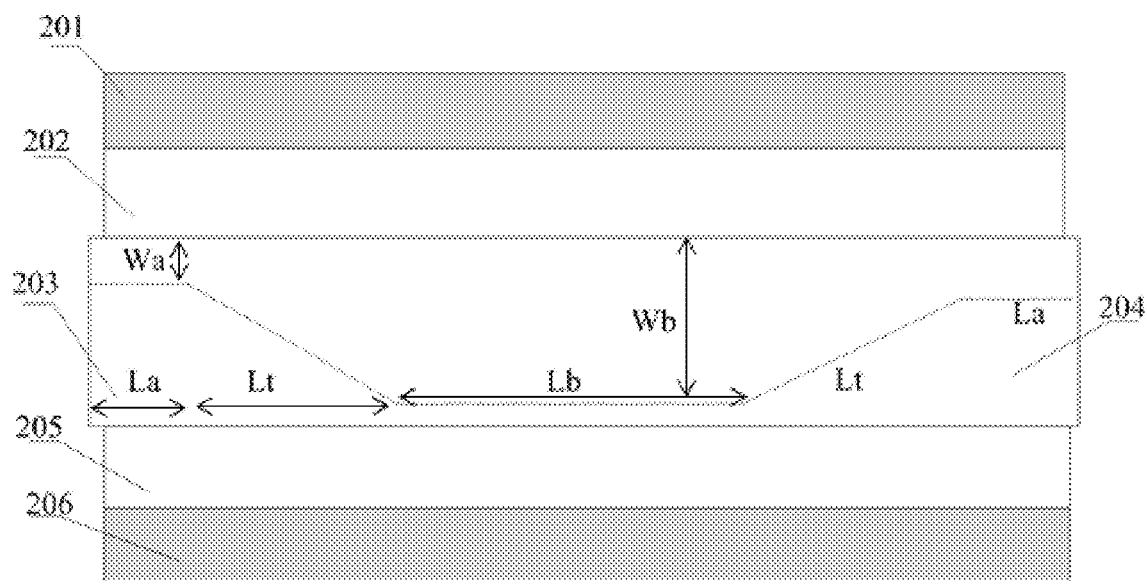
FIG. 4 is a diagram of a phase shifter with tapered vertical junction width in accordance with an embodiment of the present disclosure.

FIG. 4 illustrates a phase shifter 400 with tapered vertical PN junction width in accordance with an embodiment of the present disclosure. In this embodiment, the phase shifter 400 includes five sections along the waveguide. The first and the fifth sections have a vertical PN junction width Wa and length La. The third section has a vertical PN junction width Wb. The junction width of the second section is expanded from Wa to Wb by length Lt. The junction width of the fourth section is tapered from Wb to Wa by length Lt.

The first and the fifth sections are designed with small vertical PN junction width Wa to generate 50 Ohm microwave impedance which is matched to the standard 50 Ohm driver. The second and the fourth sections play another role of microwave impedance transformation besides the optic phase modulation. In this way, a modulator with good impedance matching to 50 Ohm driver may be realized when the phase shift 400 is incorporated into a MZI such as that shown in FIG. 1.

Example Implementation

In view of the above, a device (e.g., the electro-optic silicon modulator 100) may include an input waveguide, an input optical splitter coupled to the input waveguide, first and second optical phase shifters coupled to the input optical splitter, an output optical splitter coupled to the first and second phase shifters, and an output waveguide coupled to the output optical splitter.

In one embodiment, at least one of the first and second phase shifters may have variant capacitance per unit length along a direction of optical propagation.

In one embodiment, at least one of the first and second phase shifters may have a first section with a lowest capacitance per unit length along a direction of optical propagation.

In one embodiment, at least one of the first and second phase shifters may have a second section with a highest capacitance per unit length along the direction of optical propagation.

In one embodiment, at least one of the first and second phase shifters may have a third section with a capacitance per unit length varying from the lowest to the highest capacitance per unit length along the direction of optical propagation.

In one embodiment, at least one of the first and second phase shifters may have a fourth section with a capacitance per unit length varying from the highest to the lowest capacitance per unit length along the direction of optical propagation.

In one embodiment, at least one of the first and second phase shifters may include, in a transverse direction: a substrate, a light transmission structure formed on a top surface of the substrate, a first contact, and a second contact. The light transmission structure may include: a first doped region doped with dopants of a first polarity, a second doped region doped with dopants of a second polarity opposite the first polarity, a lateral PN junction formed by a part of the first doped region and a part of the second doped region, the lateral PN junction oriented substantially perpendicular to the top surface of the substrate, and a vertical PN junction formed by a part of the first doped region and a part of the second doped region, the vertical PN junction oriented substantially parallel to the top surface of the substrate. The first contact may be electrically coupled to the first region. The second contact may be electrically coupled to the second region.

In one embodiment, the first contact and the second contact may be positioned outside of a region in which light propagates.

In one embodiment, the first doped region may be doped with N-type dopants and the second doped region may be doped with P-type dopants.

In one embodiment, the lateral PN junction may be adjacent to the vertical PN junction.

In one embodiment, the width of the vertical PN junction may vary along a direction of optical propagation.

In one embodiment, the width of the vertical PN junction may have a smallest value followed by a biggest value along a direction of optical propagation.

In one embodiment, the width of the vertical PN junction may vary from the smallest value to the biggest value or from the biggest value to the smallest value.

In one embodiment, the first doped region may be doped with P-type dopants and the second doped region may be doped with N-type dopants.

Additional Note

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. A device, comprising:
    an input waveguide;
    an input optical splitter coupled to the input waveguide;
    first and second optical phase shifters coupled to the input optical splitter, at least one of the first and second phase shifters having variant capacitance per unit length along a direction of optical propagation;
    an output optical splitter coupled to the first and second phase shifters; and
    an output waveguide coupled to the output optical splitter.

2. The device of claim 1, wherein at least one of the first and second phase shifters has a first section with a lowest capacitance per unit length along a direction of optical propagation.

3. The device of claim 1, wherein the at least one of the first and second phase shifters has a second section with a highest capacitance per unit length along the direction of optical propagation.

4. The device of claim 1, wherein the at least one of the first and second phase shifters has a third section with a capacitance per unit length varying from the lowest to the highest capacitance per unit length along the direction of optical propagation.

5. The device of claim 1, wherein the at least one of the first and second phase shifters has a fourth section with a capacitance per unit length varying from the highest to the lowest capacitance per unit length along the direction of optical propagation.

6. The device of claim 1, wherein at least one of the first and second phase shifters comprises a lateral PN junction and a vertical PN junction in a transverse direction.

7. The device of claim 6, wherein the lateral PN junction is adjacent to the vertical PN junction.

8. The device of claim 6, wherein a width of the vertical PN junction varies along a direction of optical propagation.

9. The device of claim 6, wherein a width of the vertical PN junction has a smallest value followed by a biggest value along a direction of optical propagation.

10. The device of claim 9, wherein a width of the vertical PN junction varies gradually from the smallest value in a first section to the biggest value in a second section or from the biggest value in the second section to the smallest value in the first section.

* * * * *